United States Patent Office 3,294,816
Patented Dec. 27, 1966

3,294,816
ACID-AMINE-PHOSPHATE REACTION PRODUCT AND USE THEREOF
Edwin J. Latos, Chicago, and Charles M. Hayes, Hoffman Estates, Ill., assignors to Universal Oil Products Company, Des Plaines, Ill., a corporation of Delaware
No Drawing. Filed Dec. 12, 1963, Ser. No. 330,008
13 Claims. (Cl. 260—326)

This invention relates to a novel composition of matter comprising the reaction product of a particular type of dicarboxylic acid or anhydride thereof, amine and phosphate or thiophosphate, and to the use of the resultant reaction product.

As will be set forth in detail hereinafter, the reaction product of the present invention is particularly useful an an additive to lubricating compositions comprising a major proportion of an oil of lubricating viscosity. A specific example of such a lubricating composition is E.P. (extreme pressure) lubricating oil used, for example, in the lubrication of hypoid gears, in which service the oil must meet the severe requirements of high torque-low speed, low torque-high speed and high torque-high speed conditions. These requirements are even more severe because such oils must perform satisfactorily for long periods of time which may be as high as 100,000 miles or more and even for the life of the vehicle.

As hereinbefore set forth, a novel composition of matter of the present invention is prepared by the reaction of a particular type of dicarboxylic acid or anhydride, amine and phosphate. The particular type of acid or anhydride is a polyhalopolyhydropolycyclicdicarboxylic acid or anhydride thereof. Any suitable acid or anhydride meeting these requirements is used in accordance with the present invention. In one embodiment the acid or anhydride is of the type known in the art as "Chlorendic" or "HET" acid or anhydride. This acid is prepared by the Diels-Alder addition reaction of maleic acid and hexachlorocyclopentadiene, the latter also being referred to in the art as "Hexachlor." The corresponding anhydride is prepared by the reaction of maleic anhydride and hexachlorocyclopentadiene. This acid or anhydride also may be named 1,4,5,6,7,7-hexachlorodicyclo-(2.2.1)-5-heptene-2,3-dicarboxylic acid or the corresponding anhydrides. These compounds are prepared by the reaction of equal molar quantities of the reactants, generally by refluxing in the presence of a solvent. These reactions are well known in the art and are described, for example, in U.S. Patent 2,606,910 and elsewhere.

In place of maleic acid or maleic anhydride, it is understood that other suitable dicarboxylic acids containing carbon to carbon unsaturation may be employed. Illustrative examples include fumaric acid, itaconic acid, citraconic acid, glutaconic acid, etc. Also, in place of hexachlorocyclopentadiene, other suitable halo-substituted cycloalkadienes may be used. Illustrative examples include 1,2-dichlorocyclopentadiene, 1,5-dichlorocyclopentadiene, 1,2,3-trichlorocyclopentadiene, 1,2,3,4-tetrachlorocyclopentadiene, 1,2,3,4,5-pentachlorocyclopentadiene and similar compounds in which all or part of the chlorine is replaced by other halogen and particularly bromine.

A particularly preferred polyhalopolyhydropolycyclicdicarboxylic acid or anhydride is prepared by the Diels-Alder condensation of a conjugated aliphatic diene with an olefinic dicarboxylic acid and then further condensing the resultant cyclohexenedicarboxylic acid with a halocycloalkadiene. A particularly prefered reaction product is the Diels-Alder condensation of 1.3-butadiene with maleic acid to form 1,2,3-tetrahydrophthalic acid, followed by the Diels-Alder condensation with hexachlorocyclopentadiene. The product may be named 5,6,7,8,9,9-hexachloro - 1,2,3,4,4a,5,8,8a - octahydro - 5,8 - methano-2,3-naphthalenedicarboxylic acid, hereinafter referred to as "A" acid. The corresponding anhydride is prepared starting with maleic anhydride instead of maleic acid. The anhydride may be named 5,6,7,8,9,9-hexachloro-1,2,3,4,4a,5,8,8a - octahydro - 5,8 - methano - 2,3 - naphthalenedicarboxylic anhydride, hereinafter referred to as "A" anhydride. Here again, other conjugated aliphatic dienes may be used including, for example, 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene, conjugated octadienes, conjugated nonadienes, etc., halodienes as, for example, chloroprene and particularly 1-chlorobutadiene and 1,4-dichlorobutadiene. Similarly, other unsaturated dicarboxylic acids may be used including fumaric acid, itaconic acid, citraconic acid, glutaconic acid, mesaconic acid, etc. Also, other halocycloalkadienes may be used including, for example, those specifically hereinbefore set forth. The preparation of these compounds also is known in the art and is set forth in detail in U.S. Patent 3,017,431.

Still another preferred polyhalopolyhydropolycyclicdicarboxylic acid or anhydride is prepared by condensing cyclopentadiene with maleic acid or maleic anhydride to form norborn-5-ene-2,3-dicarboxylic acid or anhydride and then condensing the same with hexachloropentadiene. The product may be named 5,6,7,8,9,9 - hexachloro-1,2,3,4,4a,5,8,8a - octahydro - 1,4,5,8 - dimethano - 2,3-naphthalenedicarboxylic acid or anhydride hereinafter referred to as "B" acid and "B" anhydride respectively. Here again it is understood that other conjugated cycloaliphatic dienes, other unsaturated dicarboxylic acids or anhydrides and other polyhalocycloalkadienes may be used to prepare suitable polyhalopolyhydropolycyclicdicarboxylic acids or anhydrides.

From the above, it will be seen that any suitable polyhalopolyhydropolycyclicdicarboxylic acid or anhydride may be used in accordance with the present invention. The polyhalopolyhydropolycyclicdicarboxylic acid may be illustrated by the following general structure:

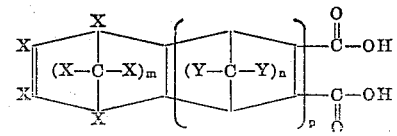

in which X is selected from the group consisting of halogen and particularly chlorine and/or bromine, hydrogen and an alkyl radical of from one to ten and preferably from one to four carbon atoms, at least two of the X's being halogen, Y is selected from the group consisting of halogen, hydrogen and an alkyl radical of one to ten and preferably from one to four carbon atoms, m is an integer of from one to four, n ranges from zero to four and p ranges from zero to four.

The above structure illustrates the dicarboxylic acid. In the interest of simplicity, the corresponding anhydride is not being illustrated, but is readily ascertainable from the above structure.

Referring to the above structure, when X is chlorine, m is one, n is zero and p is zero, the compound is 1,4,5,6,7,7-hexachloro-(2.2.1)-5-heptene-2,3-dicarboxylic acid or the corresponding anhydride. Similarly, when X is chlorine, m is one, n is zero and p is one, the compound is 5,6,7,8,9,9-hexachloro-1,2,3,4,4a,5,8,8a-octahydro-5,8-methano-2,3-naphthalenedicarboxylic acid or the corresponding anhydride. Also, when X is chlorine, Y is hydrogen, m is one, n is one and p is one, the compound is 5,6,7,8,9,9-hexachloro-1,2,3,4,4a,5,8,8a-octahydro-1,4,5,8-dimethano2,3-naphthalenedicarboxylic acid or the corresponding anhydride.

The particular type of amine for reaction with the acid or anhydride heretofore described is a polyamine. For the reasons to be hereinafter set forth, it is an essential feature of the present invention that the amine contains at least two amino groups. The amino groups may be primary, secondary and/or tertiary. In one embodiment at least one amino group is a primary or secondary amine and the other amino group or groups may be primary, secondary or tertiary. In another embodiment both amino groups of the diamine may be tertiary amines. Any suitable amine meeting the above requirements may be used in accordance with the present invention.

In one embodiment the amine is an alkylene polyamine. Illustrative alkylene polyamines include ethylenediamine, propylenediamine, butylenediamine, pentylenediamine, hexylenediamine, etc., diethylenetriamine, dipropylenetriamine, dibutylenetriamine, dipentylenetriamine, dihexylenetriamine, etc., triethylenetetraamine, tripropylenetetraamine, tributylenetetraamine, tripentylenetetraamine, trihexylenetetraamine, etc., as well as the alkylene polyamines in which one or more of the nitrogen atoms contain alkyl substituents, the alkyl substituent or substituents being selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, etc. Illustrative amines in this embodiment include N-alkyl-ethylenediamine, N,N'-dialkyl-ethylenediamine, similarly substituted propylenediamine, butylenediamine, pentylenediamine, hexylenediamine, etc., N-alkyl-diethylenetriamine, $N^1,N^3$-dialkyl-diethylenetriamine, $N^1,N^2,N^3$-trialkyl-diethylenetriamine, similarly substituted dipropylenetriamine, dibutylenetriamine, dipentylenetriamine, dihexylenetriamine, etc., N-alkyl-triethylenetetraamine, $N^1,N^4$-dialkyl-triethylenetetraamine, $N^1,N^2,N^4$-trialkyl-triethylenetetraamine, $N^1,N^2,N^3,N^4$-tetraalkyl-triethylenetetraamine, similarly substituted tripropylenetetraamine, tributylenetetraamine, tripentylenetetraamine, trihexylenetetraamine, etc. It is understood that the alkyl groups will be selected from those hereinbefore set forth.

In another embodiment the diamines are N-alkyl-diaminoalkanes. A particularly preferred amine of this class comprises an N-alkyl-1,3-diaminopropane in which the alkyl group contains from about eight to about twenty-five carbon atoms. A number of N-alkyl-diaminoalkanes of this class are available commercially, such as "Duomeen T" and "Diam 26" in which the alkyl group is derived from tallow and contains from about twelve to about twenty carbon atoms per group, and mostly sixteen to eighteen carbon atoms. Other N-alkyl-1,3-diaminopropanes may be prepared to contain any number of carbon atoms desired in the alkyl group and thus the alkyl group is selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, etc.

While the N-alkyl-1,3-diaminopropanes are preferred, it is understood that other suitable N-alkyl-diaminoalkanes may be employed. Illustrative examples include N-alkyl-1,2-diaminoethane,
N-alkyl-1,2-diaminopropane,
N-alkyl-1,2-diaminobutane,
N-alkyl-1,3-diaminobutane,
N-alkyl-1,4-diaminobutane,
N-alkyl-1,2-diaminopentane,
N-alkyl-1,3-diaminopentane,
N-alkyl-1,4-diaminopentane,
N-alkyl-1,5-diaminopentane,
N-alkyl-1,2-diaminohexane,
N-alkyl-1,3-diaminohexane,
N-alkyl-1,4-diaminohexane,
N-alkyl-1,5-diaminohexane,
N-alkyl-1,6-diaminohexane, etc.

In another embodiment the amine is an aromatic diamine. Illustrative examples include ortho-, meta- and particularly para-phenylenediamines, as well as the N-alkylated and/or N,N'-dialkylated phenylenediamines in which the alkyl group or groups contain from one to twelve or more carbon atoms. Other aromatic amines include diaminodiphenyl alkanes in which the alkane group contains from one to six or more carbon atoms, diaminodiphenyl ether, diaminodiphenyl sulfide, diaminodiphenyl amine, as well as the diaminodiphenyl compounds in which one or both of the amino groups are substituted with an alkyl radical of from one to sixteen or more carbon atoms each. It is understood that a mixture of the aliphatic polyamines and/or of the aromatic polyamines may be used for reaction with the acid or anhydride hereinbefore set forth.

The reaction of the acid or anhydride with the polyamine will be selected with particular regard to the acid or anhydride with which it is to be reacted. For example, when the "HET" acid or anhydride is to be used, the polyamine should be a highly alkylated polyamine. For example, preferred diamines for reaction with the "HET" acid or anhydride include "Duomeen T" or "Diam 26" or other highly alkylated diamines. On the other hand, when using the "A" acid or "A" anhydride, a stronger polyamine may be used including ethylenediamine, diethylenetriamine, etc.

The specific conditions for reacting the acid or anhydride and polyamine will depend upon whether the reaction product is to be a salt or neutralization product formed under conditions which avoid the liberation of water or whether the reaction product is to be formed with the liberation of water. When the reaction product is to be a salt, the polyamine may comprise primary, secondary and/or tertiary amine groups. When the mono or half salt is desired, the reactants are reacted in an equal mole proportion of acid and polyamine. When the double salt is desired, the reactants are reacted in a proportion of one mole of acid and two moles of polyamine. However, when desired, an excess of one of the reactants may be used. The acid is used for the preparation of the salt. When the anhydride is to be used, it first should be hydrolyzed to form the acid for subsequent preparation of the salt.

As hereinbefore set forth, the formation of the salt is effected under mild conditions and conveniently is effected by intimately mixing the reactants at ambient temperature (about 10° to about 32° C.), although an elevated temperature which generally will not exceed about 70° C. may be employed, particularly when the reaction is effected under superatmospheric pressure which may range from 5 to 500 pounds per square inch or more. The time of mixing will be sufficient to effect substantially complete reaction and may vary from about 0.25 to 12 hours or more. The reaction is readily effected by intimately mixing the reactants, preferably in the presence of a suitable solvent. The solvent is used to facilitate dissolving the reactants and particularly the acid and thereby forming a readily reactable solution. Either one or both of the reactants may be prepared as separate solutions in the solvent and the reactants then are intimately mixed. Any suitable solvent may be used and, in one embodiment, preferably comprises an aromatic hydrocarbon including benzene, toluene, xylene, ethylbenzene, cumene, etc., or a mixture thereof. In another embodiment the solvent comprises a paraffinic hydrocarbon including pentane, hexane, heptane, octane, nonane, decane or a mixture thereof. In another embodiment the solvent comprises an ether and particularly ethyl ether. It is understood that any suitable solvent in which the reactants are soluble and which is inert under these conditions may be employed. In most cases the solution of the salt in the solvent will be used as such in the next step of the process. However, when desired, the solvent may be removed from the salt in any suitable manner.

When the reaction of the acid or anhydride and amine is effected with the liberation of water, the reactants are reacted in a ratio of one mole proportion of acid and from one to two mole proportions of polyamine and equal mole proportions of anhydride and polyamine. Here again, an excess of one of the reactants may be employed when desired. In order to favor the mole for mole reaction product, an excess of the polyamine preferably is used and this excess may range up to ten or more mole proportions of polyamine per one mole proportion of the anhydride. One or both of the reactants are conveniently prepared as a solution in a solvent, which solvent conveniently is selected from those hereinbefore specifically set forth. The reactants then are commingled and heated to refluxing conditions to cause interaction of the acid or anhydride and the polyamine, with the liberation of water. The reflux temperature will depend upon the particular solvent used and generally will be within the range of from about 80° to about 250° C. When desired, the reaction is effected under superatmospheric pressure which may be within the range of from 5 to 500 pounds per square inch or more. The time of refluxing generally will range from about 0.5 to 12 hours or more. The water formed during the reaction preferably is continuously removed from the reaction zone.

In the preparation of the reaction product accompanied by the liberation of water, it is believed that the reaction product is an imide-amine. In one embodiment this product is recovered in admixture with the solvent and may be used as such for the next step of the process. However, when desired, the solvent may be removed in any suitable manner, including distillation under atmospheric or subatmospheric pressure to recover the intermediate product free of solvent.

The reaction product of the acid or anhydride and amine is reacted to form the phosphate salt. While phosphoric acid may be used, preferably an alkyl phosphate is employed. Any suitable alkyl phosphate is used and includes both the alkyl acid orthophosphates and the alkyl acid pyrophosphates. In the alkyl acid orthophosphates, the monoalkyl ester, dialkyl ester or a mixture thereof may be employed. In the alkyl acid pyrophosphates, the monoalkyl ester, dialkyl ester, trialkyl ester or mixtures thereof may be employed, the dialkyl esters being preferred and the ester groups may be attached to the same or different phosphorus atom. Generally, however, this compound will be symmetrical and, accordingly, the alkyl ester groups will be attached to different phosphorus atoms.

In a preferred embodiment the alkyl phosphate contains at least one alkyl group of at least six carbon atoms and more particularly from about six to about twenty or more carbon atoms. Illustrative preferred alkyl acid orthophosphates include monohexyl acid orthophosphate, dihexyl acid orthophosphate, mixture of mono- and dihexyl acid orthophosphates, monoheptyl acid orthophosphate, diheptyl acid orthophosphate, mixture or mono- and diheptyl acid orthophosphates, monooctyl acid orthophosphate, dioctyl acid orthophosphate, mixture of mono- and dioctyl acid orthophosphates, monononyl acid orthophosphate, dinonyl acid orthophosphate, mixture of mono- and dinonyl acid orthophosphates, monodecyl acid orthophosphate, didecyl acid orthophosphate, mixture of mono- and didecyl acid orthophosphates, monoundecyl acid orthophosphate, diundecyl acid orthophosphate, mixture of mono- and diundecyl acid orthophosphates, monododecyl acid orthophospate, didodecyl acid orthophosphate, mixture of mono- and didodecyl acid orthophosphates, monotridecyl acid orthophosphate, ditridecyl acid orthophosphate, mixture of mono- and ditridecyl acid orthophosphates, monotetradecyl acid orthophosphate, ditetradecyl acid orthophosphate, mixture of mono- and ditetradecyl acid orthophosphates, monopentadecyl acid orthophosphate, dipentadecyl acid orthophosphate, mixture of mono- and dipentadecyl acid orthophosphates, mono- hexadecyl acid orthophosphate, dihexadecyl acid orthophosphate, mixture of mono- and dihexadecyl acid orthophosphates, monoheptadecyl acid orthophosphate, diheptadecyl acid orthophosphate, mixture of mono- and diheptadecyl acid orthophosphates, monotadecyl acid orthophosphate, dioctadecyl acid orthophosphates, mixture of mono- and dioctadecyl acid orthophosphates, monononadecyl acid orthophosphate, dinonadecyl acid orthophosphate, mixture of mono- and dinonadecyl acid orthophosphates, monoeicosyl acid orthophosphate, dieicosyl acid orthophosphates, mixture of mono- and dieicosyl acid orthophosphates, etc. In other embodiment the alkyl group or groups are selected from methyl, ethyl, propyl, butyl and pentyl. It is understood that a mixture of the phosphates having alkyl groups of different chain lengths may be employed.

Preferred alkyl acid pyrophosphates include monohexyl acid pyrophosphate, dihexyl acid pyrophosphate, mixture of mono- and dihexyl acid pyrophosphates, monoheptyl acid pyrophosphate, diheptyl acid pyrophosphate, mixture of mono- and diheptyl acid pyrophosphates, monooctyl acid pyrophosphate, dioctyl acid pyrophosphate, mixture of mono- and dioctyl acid pyrophosphates, monononyl acid pyrophosphate, dinonyl acid pyrophosphate, mixture of mono- and dinonyl acid pyrophosphates, monodecyl acid pyrophosphate, didecyl acid pyrophosphate, mixture of mono- and didecyl acid pyrophosphates, monoundecyl acid pyrophosphate, diundecyl acid pyrophosphate, mixture of mono- and diundecyl acid pyrophosphates, monododecyl acid pyrophosphate, didodecyl acid pyrophosphate, mixture of mono- and didodecyl acid pyrophosphates, monotridecyl acid pyrophosphate, ditridecyl acid pyrophosphate, mixture of mono- and ditridecyl acid pyrophosphates, monotetradecyl acid pyrophosphate, ditetradecyl acid pyrophosphate, mixture of mono- and ditetradecyl acid pyrophosphates, monopentadecyl acid pyrophosphate, dipentadecyl acid pyrophosphate, mixture of mono- and dipentadecyl acid pyrophosphates, monohexadecyl acid pyrophosphate, dihexadecyl acid pyrophosphate, mixture of mono- and dihexadecyl acid pyrophosphates, monoheptadecyl acid pyrophosphate, diheptadecyl acid pyrophosphate, mixture of mono- and diheptadecyl acid pyrophosphates, monooctadecyl acid pyrophosphate, dioctadecyl acid pyrophosphate, mixture of mono- and dioctadecyl acid pyrophosphates, monononadecyl acid pyrophosphate, dinonadecyl acid pyrophosphate, mixture of mono- and dinonadecyl acid pyrophosphates, monoeicosyl acid pyrophosphate, dieicosyl acid pyrophosphate, mixture of mono- and dieicosyl acid pyrophosphates, etc. In another embodiment the alkyl group or groups are selected from methyl, ethyl, propyl, butyl and pentyl. It is understood that a mixture of the phosphates having alkyl groups of different chain lengths may be employed.

Another phosphate for reaction with the acid or anhydride and polyamine reaction product is prepared by the oxyalkylenation of an alcohol, which may be of aliphatic or aromatic configuration, and then forming the phosphate thereof. Aliphatic alcohols for oxyalkylenation may be saturated or unsaturated and preferably contain at least four carbon atoms and more particularly from about six to twenty or more carbon atoms. Illustrative alcohols include butyl alcohol, pentyl alcohol, hexyl alcohol, heptyl alcohol, octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, nonadecyl alcohol, eicosyl alcohol, etc. These alcohols conveniently are derived from fatty acids and accordingly include, for example, lauryl alcohol, myristyl alcohol, palmityl alcohol, stearyl alcohol, decylenyl alcohol, dodecylenyl alcohol, palmitoleyl alcohol, oleyl alcohol, linoleyl alcohol, linolenyl alcohol, gadoleyl alcohol, etc.

Aromatic alcohols include phenol and particularly alkylphenols. The alkylphenols preferably contain at least four more particularly from about six to about twenty carbon atoms in the alkyl group. Illustrative alkylphenols include hexylphenol, heptylphenol, octylphenol, nonylphenyl, decylphenol, undecylphenol, dodecylphenol, tridecylphenol, tetradecylphenol, pentadecylphenol, hexadecylphenol, heptadecylphenol, octadecylphenol, nonadecylphenol, eicosylphenol, etc., as well as dialkyl and trialkylphenols in which the alkyl groups are selected from those hereinbefore specifically set forth. Also, the polyalkylphenols may contain one or more alkyl groups containing from one to six carbon atoms and one or more alkyl groups containing from six to twenty carbon atoms.

Oxyalkylenation of the aliphatic or aromatic alcohol is effected in any suitable manner. While ethylene oxide is preferred for reaction with the aliphatic or aromatic alcohol, it is understood that propylene oxide, butylene oxide, pentylene oxide, hexylene oxide, etc., may be used. The oxyalkylenation is effected by reacting the aliphatic or aromatic alcohol with the alkylene oxide, particularly ethylene oxide, in the molar ratios to produce the oxyalkylenated alcohol or phenol containing the oxyalkylenated group in the desired proportion. In a preferred embodiment, the oxyalkylenated alcohol or phenol contains from two to about twelve or more and particularly from two to about six oxyalkylene groups. The oxyalkylenation is effected in any suitable manner and generally will be conducted at a temperature of from ambient to about 175° C. and more particularly from about 90° to about 150° C., preferably in the presence of a catalyst such as sodium hydroxide, potassium hydroxide, tertiary amine, quaternary hydroxide, etc. When the oxyalkylenation is to be limited to the addition of one oxy group, the catalyst is used with the alkanols but may be omitted with the alkylphenols. Superatmospheric pressure may be employed and may be within the range of from about 10 to 1000 pounds or more.

The oxyalkylenated aliphatic or aromatic alcohol then is reacted in any suitable manner with $P_2O_5$ to form the desired phosphate. One molar proportion of $P_2O_5$ or other suitable phosphorus oxide is reacted per one or two molar proportions of the oxyalkylenated hydrocarbon. In general, an excess of $P_2O_5$ is employed in order to insure complete reaction. The reaction is effected at a temperature within the range of from ambient to about 110° C. and under substantially anhydrous conditions. The resultant free acid form of the phosphate generally is recovered as a viscous liquid.

Another embodiment of the invention comprises the alkyl thiophosphate salt of the acid or anhydride-polyamine reaction product. Illustrative preferred dialkyl-dithiophosphates include monohexyl-dithiophosphate, dihexyldithiophosphate, mixture of mono- and dihexyl-dithiophosphate, monoheptyl-dithiophosphate, diheptyl-dithiophosphate, mixture of mono- and diheptyl-dithiophosphate, monooctyl-dithiophosphate, dioctyl-dithiophosphate, mixture of mono- and dioctyl-dithiophosphate, mononyl - dithiophosphate, dinonyl - dithiophosphate, mixture of mono- and dinonyl-dithiophosphate, monodecyldithiophosphate, didecyl-dithiophosphate, mixture of mono- and didecyl-dithiophosphate, monoundecyl-dithiophosphate, diundecyl-dithiophosphate, mixture of mono- and diundecyl-dithiophosphate, monododecyl-dithiophosphate, didodecyl-dithiophosphate, mixture of mono- and didocyl-dithiophosphate, monotridecyl-dithiophosphate, ditridecyl-dithiophosphate, mixture of mono- and ditridecyl-dithiophosphate, monotetradecyl-dithiophosphate, ditetradecyl-dithiophosphate, mixture of mono- and ditetradecyl-dithiophosphate, monopentadecyl-dithipohosphate, dipentadecyl-dithiophosphate, mixture of mono- and dipentadecyl-dithiophosphate, monohexadecyl-dithiophosphate, dihexadecyl-dithiophosphate, mixture of mono- and dihexadecyl-dithiophosphate, monoheptadecyl-dithiophosphate, diheptadecyl-dithiophosphate, mixture of mono- and diheptadecyl-dithiophosphate, monooctadecyl-dithiophosphate, dioctadecyl-dithiophate, mixture of mono- and dioctadecyl-dithiophosphate, monononadecyl-dithiophosphate, dinonadecyl-dithiophosphate, mixture of mono- and dinonadecyl-dithiophosphate, monoeicosyl-dithiophosphate, dieicosyl - dithiophosphate, mixture of mono- and dieicosyl-dithiophosphate, etc. The oxyalkylenated aliphatic or aromatic alcohol dithiophosphates are prepared in substantially the same manner as hereinbefore set forth for the oxyalkylenated aliphatic or aromatic alcohol phosphates, except that $P_2S_5$ or other suitable phosphorus sulfide is used instead of the phosphorus oxide.

The phosphate or thiophosphate salt of the acid or anhydride-polyamine reaction product is prepared in any suitable manner. In general, the phosphate or thiophosphate will be used in a ratio of from one to two mole proportions of phosphate or thiophosphate per one mole proportion of acid or anhydride-amine reaction product. However, an excess or deficiency of the phosphate or thiophosphate may be employed when desired and thus may be within the range of from about 0.5 to about 4 mole proportions of phosphate or thiophosphate per one mole proportion of acid or anhydride-amine reaction product. The salt is prepared in any suitable manner and conveniently by intimately mixing the acid or anhydride-polyamine reaction product and the phosphate or thiophosphate at ambient temperature although, here again, an elevated temperature may be used which generally will not exceed about 70° C. The mixing may be effected at atmospheric pressure or, when desired, under superatmospheric pressure which may be within the range of from about 5 to 100 pounds per square inch or more. Also, when desired, the phosphate or thiophosphate may be prepared as a solution in a suitable solvent and then commingled with the other reactant. Conveniently, the solvent will be the same as used in the earlier step of the process.

In general, it is preferred to prepare the reaction product of the present invention in the sequence hereinbefore set forth of reacting the acid or anhydride with the amine and then with the phosphate or thiophosphate. In another embodiment the phosphate or thiophosphate may be reacted with the polyamine to form the phosphate or thiophosphate-polyamine salt and then reacted with the acid or anhydride. In still another embodiment the phosphate or thiophosphate may be commingled in an oil or other substrate and the acid or anhydride-amine reaction product added thereto to form the phosphate salt in situ.

Without intending to be limited thereto, it is believed that the novel compositions of matter of the present invention will be of the general structure illustrated below. In the interest of simplicity, the structures shown below are limited to products prepared from a diamine, it being understood that the structures will be modified when a polyamine containing three or more nitrogen atoms is used in preparing the composition of matter. In another embodiment the polyamine is a cyclic polyamine and particularly cyclohexyl diamine.

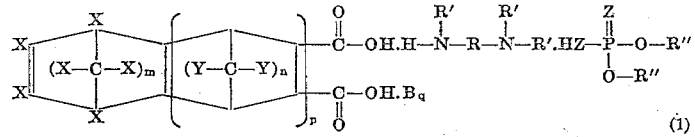

(1)

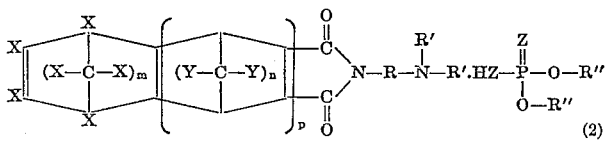

(2)

where X, Y, m, n, and p have the same designations as hereinbefore set forth, R is selected from the group consisting of an alkylene group of from two to twenty carbon atoms and an aryl group, R' is selected from the group consisting of hydrogen and an alkyl group of from one to thirty carbon atoms, R" is selected from the group consisting of hydrogen, an alkyl group of from one to thirty carbon atoms, an oxyalkylenated aliphatic alcohol and an oxyalkylenated aromatic alcohol, Z is selected from the group consisting of oxygen and sulfur, B is selected from the group consisting of a diamine, a diamine phosphate and a diamine thiophosphate, and q ranges from zero to one.

Referring to structure (1), when q is zero, the composition of matter is the mono- or half salt prepared under conditions which avoid the liberation of water as hereinbefore set forth. When q is one, the composition of matter is the double salt also prepared under conditions which avoid the liberation of water. Figure (2) illustrates the reaction product formed under conditions to liberate water and, as hereinbefore set forth, is believed to be an imide-amine-phosphate salt.

As hereinbefore set forth, applicants do not intend to be limited to the structures illustrated above. It is understood that the final product may contain a mixture of compounds including those formed by intermolecular condensation, polymerization, etc. Because the specific structure of the final products has not been definitely established, applicants are claiming the composition by the method of manufacture.

Conveniently the final product is recovered as a solution in a suitable solvent and is used in this manner as an additive to an organic substrate. However, when the product is recovered in the absence of a solvent or when the product is not sufficiently soluble in the substrate, the desired solubility may be obtained by dissolving the reaction product in a mutual solvent. Suitable solvents for this purpose comprise phenols and particularly alkylphenols of polyalkylphenols in which the alkyl group contains from six to twenty carbon atoms. The phenol may be used in a concentration of from about 5% and preferably from about 25% to about 200% by weight, and more particularly from about 30% to about 100% by weight of the reaction product of the present invention.

As hereinbefore set forth, the acid or amine phosphate reaction product of the present invention is particularly advantageous for use in lubricating oil and particularly in lubricating oils which must meet severe requirements. It will be noted that the reaction product of the present invention contains halogen, nitrogen and phosphorus in one embodiment and also sulfur in another embodiment. Experience has shown that compounds containing these elements are especially advantageous for use in lubricating oils subject to severe conditions. However, while the reaction product of the present invention is especially useful in such lubricating oils, it is understood that it also is used to advantage in other lubricating oils. Another advantage of the compositions of the present invention is that certain of these compositions will not cause darkening of the oil during use.

The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other natural oils include those of animal, marine or vegetable origin.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentane-diol di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

While the reaction product of the present invention is particularly advantageous in substrates subjected to high temperatures, it is understood that it may be used in other substrates which deteriorate in storage, during treatment and/or in use. These other substrates include motor fuels such as unsaturated gasoline, blends of unsaturated and saturated gasolines, etc., jet fuel, diesel oil, fuel oil, residual oil, drying oil, rubber, polyolefins, resins, waxes, etc.

The reaction product of the present invention is used as an additive in lubricating oil in a small but stabilizing concentration. Depending upon the particular use, the additive may be employed in a concentration of from about 0.01% to about 25% and preferably from about 0.05% to about 10% by weight of the oil. These and the following concentrations are on the basis of the active constituent and do not include the solvent or solubilizing phenol when used. When used in conventional lubricating oil, the additive generally is employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to about 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the additive may be used along with other additives incorporated in the oil for specific purposes. In most cases, it is desirable to also incorporate an antioxidant in the oil. Preferred antioxidants are of the phenolic type and include tertiarybutylcatechol, 2,6-ditertiarybutyl-4-methylphenol, 2,4-dimethyl-6-tertiarybutylphenol, etc., 2-tertiarybutyl-4-methoxyphenol, 2-tertiarybutyl-4-ethoxyphenol, etc. Also, other additives incorporated in lubricating oil include metal deactivator, dye, viscosity index improver, pour point depressor, antifoaming additive, detergent, etc.

The following examples are introduced to illustrate further the novelty and utility of the present invention but not with the intention of unduly limiting the same.

*Example I*

The product of this example was prepared by the reaction of "A" anhydride (5,6,7,8,9,9-hexachloro-1,2,3,4, 4a,5,8,8a-octahydro - 5,8 - methano-2,3-naphthalenedicarboxylic anhydride) with diethylenetriamine and then reacting with mixed mono- and ditridecyl acid orthophosphates. The first reaction was effected by gradually adding 213 g. (0.5 mole) of "A" anhydride to 258 g. (2.5 moles) of diethylenetriamine over a one hour period. Following this, 200 ml. of benzene was added and the mixture was heated and refluxed for about 1.5 hours. Approximately 9 ml. of water was removed during the refluxing. The benzene was removed by distillation on a steam bath. Excess diethylenetriamine was removed by distillation under high vacuum. At this point, the reaction mixture was a yellow-orange brittle solid having a basic nitrogen equivalent weight of 220 g. The product was ground to a fine powder and washed several times with water, dissolved in methanol and dried with anhydrous sodium sulfate. This was followed by filtering and evaporation of the methanol, to leave a red viscous clear liquid which crystallized to a red solid upon standing. The product had a basic nitrogen equivalent weight of 262 g. This corresponds to a theoretical nitrogen equivalent of 255 for the equal mole reaction product which, as hereinbefore set forth, is believed to be an imide-amine.

The reaction product of "A" anhydride and diethylenetriamine, prepared in the above manner, then was reacted with mixed mono- and ditridecyl acid orthophosphates by intimately mixing at room temperature 2.55 g. (0.01 equivalent) of the "A" anhydride-diethylenetriamine reaction product with 3.73 g. (0.01 equivalent) of mixed mono- and ditridecyl acid orthophosphate. The mixture was warmed and stirred until homogenous. Upon cooling the product was recovered as a brown clear waxy solid.

*Example II*

The composition of this example is a phosphate prepared from another portion of the "A" anhydride-diethylenetriamine reaction product described in Example I. The phosphate used in this example is a polyoxyethylenated nonylphenol phosphate containing an average of about five oxyethylenated groups. The polyoxyethylenated nonylphenol phosphate was prepared in the manner hereinbefore described. The salt was prepared by mixing at room temperature, with intimate stirring, 5.12 g. (0.02 equivalent) of the "A" anhydride-diethylenetriamine reaction product with 22.4 g. (0.02 equivalent) of the polyoxyethylenated nonylphenol phosphate. The product was recovered as a brown clear viscous liquid and, upon analysis, was found to have a refractive index $n_{25}^D$ of 1.508 and a Gardner vertical viscosity at 60° C. of 22 sec.

*Example III*

The composition of this example is a dithiophosphate prepared from another portion of the "A" anhydride-diethylenetriamine reaction product described in Example I. The dithiophosphate used in this example is di-secoctyl-dithiophosphate. The salt was prepared by mixing at room temperature, with intimate stirring, 2.55 g. (0.01 equivalent) of the "A" anhydride-diethylenetriamine reaction product with 3.95 g. (0.01 equivalent) of the di-secoctyl-dithiophosphate. The product was recovered as a brown clear very viscous liquid.

*Example IV*

The composition of this example is the polyoxyethylenated nonylphenol dithiophosphate salt prepared from another portion of the "A" anhydride-diethylenetriamine reaction product described in Example I. The polyoxyethylenated nonylphenol dithiophosphate is prepared in the manner hereinbefore described. The salt is prepared by admixing equivalent proportions of the reactants at room temperature with intimate mixing.

Example V

The composition of this example is the mixed mono- and dioctyl acid orthophosphate salts of the mono salt prepared by the reaction of equal mole proportions of "A" acid and "Duomeen T." As hereinbefore set forth, "Duomeen T" is N-alkyl-1,3-diaminopropane in which the alkyl group contains from twelve to twenty carbon atoms and mostly sixteen to eighteen carbon atoms. The "A" acid and "Duomeen T" are admixed in equal mole proportions at room temperature with intimate stirring. For ease in handling and reaction, the "A" acid is prepared as a solution in benzene and the "Duomeen T" is added thereto. Following completion of the reaction, the solvent is removed from the mixture and the mono salt is recovered as a viscous material. To this product is added an equivalent proportion of the mixed mono- and dioctyl acid orthophosphates and intimately stirred at room temperature until completion of the reaction.

Example VI

The double dithiophosphate salt of the reaction product of "A" acid and "Duomeen T" is prepared by reacting two mole proportions of "Duomeen T" with one mole proportion of "A" acid at room temperature with intimate stirring. Here again, the reaction conveniently is effected in benzene solvent. The double salt is recovered in the solvent and to this is added two equivalents of the mixed mono- and didecyl dithiophosphates per one equivalent of the double salt of "A" acid and "Duomeen T." The salt is prepared by intimately mixing the reactants at room temperature.

Example VII

The composition of this example is prepared by reacting equal mole proportions of "B" anhydride (5,6,7,8,9,9-hexachloro - 1,2,3,4,4a,5,8,8a - octahydro-1,4,5,8-dimethano-2,3-naphthalenedicarboxylic anhydride) and "Diam 26." As hereinbefore set forth, "Diam 26" is substantially the same as "Duomeen T." This reaction is effected by refluxing the "B" anhydride and "Diam 26" in benzene solvent, with the concomitant removal of water formed during the reaction. Following completion of the reaction, an equivalent proportion of polyoxyethylenated nonylphenol phosphate containing an average of about five polyoxyethylenated groups is commingled with the "B" anhydride-"Diam 26" reaction mixture. The resulting mixture is stirred at room temperature for a sufficient time to effect salt formation.

Example VIII

The composition of this example is prepared by reacting equal mole proportions of "HET" acid (1,4,5,6,7,7-hexachlorodicyclo - (2.2.1) - 5 - heptene-2,3-dicarboxylic acid) and "Duomeen T." The reaction is conveniently effected in the presence of ethyl ether solvent and the reaction mixture is intimately stirred at room temperature until completion of the reaction. To the reaction mixture there is added an equivalent proportion of dodecyl thiophosphate and then is stirred at room temperature until salt formation is effected.

Example IX

The double salt of "HET" acid, "Duomeen T" and mixed mono- and didodecyl dithiophosphates is prepared by first reacting, at room temperature, one mole proportion of "HET" acid and two mole proportions of "Duomeen T" in ethyl ether solvent. Following completion of the reaction, two equivalents of mixed mono- and didodecyl dithiophosphates are added and the reaction mixture is stirred at room temperature until salt formation is completed.

Example X

The composition of this example is prepared by reacting equal mole proportions of "B" anhydride and N,N'-di-secoctyl-p-phenylenediamine under refluxing conditions in the presence of benzene solvent. Following completion of the reaction, an equivalent proportion of polyoxypropylenated dinonylphenol phosphate containing an average of four oxypropylene groups is added to the amide-amine mixture and is stirred intimately at room temperature until salt formation is effected.

Example XI

As hereinbefore set forth, the salt of the present invention is conveniently prepared in solution for use as an additive. When the salt is to be used as an additive in a synthetic lubricating oil such as, for example, dioctyl sebacate, marketed commercially under the trade name of "Plexol 201," the salt conveniently is prepared as a stock solution in this synthetic oil. Such an additive composition was prepared by commingling at room temperature and intimately mixing 2.55 g. of the "A" anhydride-diethylenetriamine reaction product, prepared as described in Example I, 3.73 g. of mixed mono- and ditridecyl acid orthophosphates and 6.28 g. of dioctyl sebacate. The resultant mixture is a viscous amber liquid solution.

Example XII

Another composition similar to that described in Example II was prepared in admixture with dioctyl sebacate as follows: 1.28 g. of the "A" anhydride-diethylenetriamine reaction product prepared as described in Example I, 5.6 g. of polyoxyethylenated nonylphenol phosphate described in Example II and 6.88 g. of dioctyl sebacate were mixed at room temperature and intimately stirred to form a viscous amber liquid.

Example XIII

Another composition was prepared by commingling 2.55 g. of the "A" anhydride-diethylenetriamine reaction product prepared as described in Example I, 9.63 g. of the di-secoctyl-dithiophosphate described in Example III and 12.2 g. of dioctyl sebacate. This mixture was intimately stirred at room temperature and the product was recovered as a viscous liquid.

Example XIV

The composition of this example was prepared by commingling 2.55 g. of the "A" anhydride-diethylenetriamine reaction product prepared as described in Example I, 9.63 g. of polyoxyethylenated nonylphenol dithiophosphate containing four oxyethylene groups and 12.2 g. of dioctyl sebacate. The mixture was stirred at room temperature and the product was recovered as a viscous liquid.

Example XV

As hereinbefore set forth, the salt of the present invention is of especial utility in substrates encountering high temperatures during use. An example of such a substrate is lubricating oil and especially such oils used in the lubrication of hypoid gears which must meet severe requirements of high torque-low speed, low torque-high speed and high torque-high speed conditions. The requirements are even more severe because such oils must retain their lubricity properties for long periods of time as exemplified, for example, by the recommendations of not changing oil for one year or more or 20,000 miles or more of operation and even up to 100,000 miles or for the life of the vehicle.

One method of evaluating E.P. (extreme pressure) lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two V-shaped bearings which are spring loaded against the pin and provided with means for varying the load. The oil to be tested is poured into a metal trough in which the pin and bearings are partly submerged. The machine was operated for 5 minutes each at 250 and 500 pound loads and then 45 minutes at 750 pound load. The data collected includes the temperature of the oil at each of the loads and the torque in pounds per square inch at each load, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for 5 minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The lubricating oil used in this example is dioctyl sebacate synthetic lubricating oil marketed under the trade name of "Plexol 201."

Run No. 1 in the following table is a run made using the "Plexol" not containing an additive and thus is the blank or control run.

Run No. 2 is a run made using another sample of the "Plexol" to which had been added 2% by weight of the salt prepared as described in Example XI.

Run No. 3 is a run made using another sample of the "Plexol" to which had been added 2% by weight of the salt prepared as described in Example XII.

Run No. 4 is a run made using another sample of the "Plexol" to which had been added 2% by weight of the salt prepared as described in Example XIII.

Run No. 5 is a run made using another sample of the "Plexol" to which had been added 2% by weight of the salt prepared as described in Example XIV.

TABLE I

| Run No. | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 1 | 150 | 231 | 490-S | 3-4 | 9-10 | 18-S | 0 | 0 | S | 750 | 2 | 490 |
| 2 | 177 | 285 | 378 | 5-7 | 14-17 | 18-23 | 0 | 0 | 9 | 1,750 | 0.1 | 563 |
| 3 | 170 | 243 | 343 | 5-7 | 12-13 | 17-20 | 0 | 0 | 5 | 1,500 | 1.6 | >525 |
| 4 | 136 | 220 | 321 | 4-5 | 11-14 | 14-19 | 0 | 0 | 9 | 1,500 | 1.7 | >625 |
| 5 | 163 | 294 | 400 | 5-6 | 15-17 | 21-25 | 0 | 0 | 19 | 1,750 | 1.7 | 700 |

S=Seizure.

From the data in the above table, it will be seen that the dioctyl sebacate without additive (Run No. 1) underwent seizure at a load of 750 pounds. In contrast, seizure conditions for the samples of the dioctyl sebacate containing the additives of the present invention were 1500 and 1750 pounds. Also of importance is the fact that the oil after test in Run No. 3 was clear, thus demonstrating that the additive served to avoid darkening of the oil during the severe test conditions. Similarly, the oil in Run No. 2 underwent only little darkening during the evaluation.

*Example XVI*

Another series of evaluations were made using a purified mineral oil marketed commercially by A. H. Carnes Company as "Carnes 340 White Oil." Typical specifications of this oil include the following:

Distillation range, °F. _____ 740–975
Specific gravity at 60° F. _____ 0.8836
Viscosity:
    at 100° F. _____ 360
    at 210° F. _____ 52.2
Flash point, COC, °F. _____ 440
Pour point, °F. _____ −20
Refractive index at 68° F. _____ 1.4805
Saybolt color _____ +30

Run No. 6 in the following table is the run made using the white oil not containing an additive and thus is the blank or control run.

Run No. 7 is a run made using another sample of the white oil to which had been added 2% by weight of the additive prepared as described in Example XI.

Run No. 8 is a run made using another sample of the white oil to which had been added 2% by weight of the additive prepared as described in Example XII. The salt was not readily soluble in the white oil and accordingly was solubilized by commingling nonylphenol therewith and heating and stirring as required.

Run No. 9 is a run made using another sample of the white oil to which had been added 2% by weight of the additive prepared as described in Example XIII. Here again, the salt was solubilized with nonylphenol.

Run No. 10 is a run made using another sample of the white oil to which had been added 2% by weight of the additive prepared as described in Example XIV. Here again, the salt was solubilized with nonylphenol.

TABLE II

| | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 6 | 172 | 359-S | ------ | 5-6 | 30-S | ------ | 0 | S | ------ | 425 | <0.1 | 275 |
| 7 | 197 | 299 | 373 | 7-8 | 16-17 | 19-24 | 0 | 0 | 11 | 1,250 | 0.6 | 488 |
| 8 | 163 | 264 | 382 | 5-7 | 13-14 | 18-21 | 0 | 0 | 6 | 1,250 | 3.7 | 500 |
| 9 | 176 | 280 | 538 | 6-7 | 14-16 | 25-30 | 0 | 0 | 6 | 1,500 | 3.0 | 675 |
| 10 | 184 | 318 | 460 | 6-8 | 16-18 | 23-27 | 0 | 0 | 26 | 1,500 | 0.8 | 675 |

S=Seizure.

Here again, it will be seen that the oil without additive (Run No. 6) underwent seizure by the time the load had increased to 425 pounds. In contrast, the white oil containing the additive of the present invention did not undergo seizure until loads of 1250 and 1500 pounds. Also of importance is the fact that the white oil in Run No. 8, after exposure to the severe conditions, was clear. The oils in Runs No. 7 and 9 had darkened only slightly.

*Example XVII*

The reaction product of Example I is used in a concentration of 0.3% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 232° C., with constant agitation. Subsequently the grease is cooled, while agitating, to approximately 120° C., and then the grease is further cooled slowly to room temperature.

The stability of the grease is tested in accordance with ASTM D-942 method, in which method a sample of the grease is placed in a bomb and maintained at a temperature of 120° C. Oxygen is charged to the bomb, and the time required for a drop of 5 pounds pressure is taken as the induction period. A sample of the grease without additive will reach the induction period in about 8 hours. On the other hand, a sample of the grease containing 0.3% by weight of the additive of the present invention will not reach the induction period for more than 100 hours.

*Example XVIII*

In another embodiment the reaction products of the present invention possess insecticidal properties with good inner-therapeutic action. They may be employed against many types of mites and insects such as, for example, *Corausius larvae, Cotoneaster aphid*, apply aphid, black bean aphid, aster aphid, green peach aphid, crysanthemum aphid, pea aphid, etc. The reaction products or mixture of these may be used for the control of various larvae, mites, eggs of mites and such insects as flour bettle, Mexican bean beetle, black carpet beetle, milkweed bug, German cockroaches, southern army worms, mealy bug, sow bug, citrus red spider, greenhouse red spider, various mosquitoes, yellow fever mosquito, malarial mosquito, houseflies, etc.

As an example, an insecticidal composition is prepared by dissolving 1 g. of the reaction product of Example I and 2 cc. of benzene and emulsifying the resultant solution with 100 cc. of water using Triton X-100 as the emulsifying agent. The resulting emulsion is sprayed into a cage containing houseflies and results in greater than 98% knockdown.

*Example XIX*

Example I describes the use of a phosphate salt of amide-amine prepared from the anhydride and amine. Example V describes a phosphate salt of the mono salt of acid and amine and Example VI describes a phosphate prepared from the double salt of acid and amine. In another embodiment the phosphate salt is prepared of an amide-amine which, in turn, is prepared from the anhydride and a polyamine containing primary and/or secondary amines. When the anhydride and the amine are mixed at room temperature, with the resultant exothermic reaction occurring, it is believed that the anhydride structure is broken and one hydrogen of the amine attaches to the oxygen to form a carboxyl group and the nitrogen of the amine attaches to the other carbon atom, thereby resulting in an amide. Accordingly, when "HET" anhydride, "A" anhydride, "B" anhydride, etc., is reacted at room temperature with an alkylene polyamine, an N-alkyl-alkylene-polyamine or an N,N'-dialkyl-alkylene-polyamine, these being selected from those hereinbefore specifically set forth, an amide-amine is formed. It is understood that a mixture of products including inner salts, etc., also probably are formed. As a specific example, "A" anhydride is mixed at room temperature with N,N'-di-secoctyl-ethylenediamine and the mixture is intimately stirred. In this example, the mixture is not subjected to refluxing which, when a primary amine is used, will result in the imide-amine heretofore described. The reaction product of the acid and amine then is mixed with an equal equivalent of mixed mono- and ditridecyl acid orthophosphates to form the phosphate salt.

We claim as our invention:
1. Phosphate salt of the reaction product of compound (a) and compound (b) formed by reaction of said compounds at a temperature of from about 10° to about 250° C. in a proportion of from one mole of compound (a) with from one to two moles of compund (b), said compound (b) being selected from the group consisting of
  (1) alkylene polyamine having from 2 to 4 nitrogen atoms per molecule and containing from 2 to 6 carbon atoms per alkylene group,
  (2) alkylene polyamine having from 2 to 4 nitrogen atoms per molecule and containing from 2 to 6 carbon atoms per alkylene group and having on at least one of the nitrogen atoms an alkyl of from 1 to 20 carbon atoms,
  (3) N-alkyldiaminoalkane in which the alkyl contains from about 8 to about 25 carbon atoms and the alkane moiety contains from 2 to 6 carbon atoms,
  (4) ortho-, meta- and para-phenylenediamine,
  (5) N-alkyl and N,N'-dialkyl phenylenediamine in which each alkyl contains from 1 to about 12 carbon atoms,
  (6) diaminodiphenyl alkane containing from 1 to about 6 carbon atoms in the alkane moiety, and
  (7) diaminodiphenyl ether, diaminodiphenyl sulfide, diaminodiphenyl amine and said diaminodiphenyl compounds having on at least one of the nitrogen atoms an alkyl of from 1 to about 16 carbon atoms.
and said compound (a) being selected from the group consisting of polyhalopolyhydropolycyclicdicarboxylic acid and corresponding anhydride, said acid having the formula:

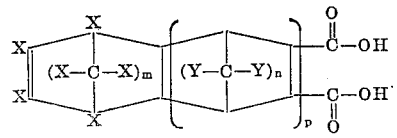

in which X is chlorine, bromine, hydrogen or alkyl of from 1 to 10 carbon atoms, at least two of the X's being chlorine or bromine, Y is chlorine, bromine, hydrogen or alkyl of 1 to 10 carbon atoms, $m$ is an integer of from 1 to 4, $n$ ranges from 0 to 4 and $p$ ranges from 0 to 4, said phosphate salt being formed by the reaction at a temperature of from ambient to about 70° C. of one mole proportion of said reaction product of compound (a) and compound (b) with from about 0.5 to about 4 mole proportions of a phosphorus compound selected from the group consisting of
  (1) phosphoric acid,
  (2) alkyl phosphate and alkyl thiophosphate containing alkyl of from 1 to about 20 carbon atoms,
  (3) phosphate and dithiophosphate of oxyalkylenated aliphatic alcohol containing from 4 to 20 carbon atoms and from 1 to 12 oxyalkylene groups of from 2 to 6 carbon atoms each.
  (4) phosphate and dithiophosphate of oxyalkylenated phenol containing from 1 to 12 oxyalkylene groups of from 2 to 6 carbon atoms each, and
  (5) phosphate and dithiophosphate of oxyalkylenated alkyl phenol containing from 1 to 3 alkyls of from 1 to 20 carbon atoms each and containing from 1 to 12 oxyalkylene groups of from 2 to 6 carbon atoms each.

2. Phosphate salt as defined in claim 1 further characterized in that said compound (a) is selected from the group consisting of 5,6,7,8,9,9-hexachloro-1,2,3,4,4a,5,8,-8a-octahydro - 5,8 - methano - 2,3 - naphthalenedicarboxylic acid, 5,6,7,8,9,9-hexachloro-1,2,3,4,4a,5,8,8a-octahydro-1,4,5,8 - dimethano - 2,3 - naphthalenedicarboxylic acid, 1,4,5,6,7,7 - hexachlorodicyclo - (2.2.1) - 5 - heptene-2,3-dicarboxylic acid and corresponding anhydrides.

3. The phosphate salt of claim 1 wherein said compound (a) is 5,6,7,8,9,9-hexachloro-1,2,3,4,4a,5,8,8a-octahydro - 5,8 - methano - 2,3 - naphthalenedicarboxylic acid.

4. The phosphate salt of claim 1 wherein said compound (a) is 5,6,7,8,9,9-hexachloro-1,2,3,4,4a,5,8,8a-octahydro - 5,8 - methano - 2,3 - naphthalenedicarboxylic anhydride.

5. The phosphate salt of claim 1 wherein said compound (a) is 5,6,7,8,9,9-hexachloro-1,2,3,4,4a,5,8,8a-octahydro - 1,4,5,8 - dimethano - 2,3 - naphthalenedicarboxylic acid.

6. The phosphate salt of claim 1 wherein said compound (a) is 5,6,7,8,9,9-hexachloro-1,2,3,4,4a,5,8,8a-octahydro - 1,4,5,8 - dimethano - 2,3 - naphthalenedicarboxylic anyhdride.

7. The phosphate salt of claim 1 wherein said compound (a) is 1,4,5,6,7,7-hexachlorodicyclo-(2.2.1)-5-heptene-2,3-dicarboxylic acid.

8. The phosphate salt of claim 1 wherein said polyamine is alkylene compound (b) having from 2 to 4 nitrogen atoms per molecule and containing from 2 to 6 carbon atoms per alkylene group.

9. The phosphate salt of claim 1 wherein said compound (b) is N-alkylated-diaminoalkane containing from about eight to about twenty-five carbon atoms in the alkyl group and from 2 to 6 carbon atoms in the alkane moiety.

10. The phosphate salt of claim 1 further characterized in that said reaction product of compound (a) and compound (b) is reacted with a mixture of mono- and dialkyl phosphates containing from about 6 to about 20 carbon atoms in each alkyl group.

11. The phosphate salt of claim 1 further characterized in that said reaction product of compound (a) and compound (b) is reacted with a mixture of mono- and dialkyl dithiophosphates containing from about 6 to about 20 carbon atoms in each alkyl group.

12. The phosphate salt of claim 1 further characterized in that said reaction product of compound (a) and compound (b) is reacted with oxyalkylenated alkylphenol phosphate containing from 1 to 12 oxyalkylene groups of from 2 to 6 carbon atoms each and having from 4 to 20 carbon atoms in the alkyl group.

13. The phosphate salt of claim 1 further characterized in that said reaction product of compound (a) and compound (b) is reacted with oxyalkylenated alkylphenol dithiophosphate containing from 1 to 12 oxyalkylene groups of from 2 to 6 carbon atoms each and having from 4 to 20 carbon atoms in the alkyl group.

References Cited by the Examiner
UNITED STATES PATENTS

| | | | |
|---|---|---|---|
| 3,177,225 | 4/1965 | Fenyes | 260—326 |
| 3,184,412 | 5/1965 | Lowe et al. | 252—46.7 |
| 3,185,645 | 5/1965 | Clayton | 252—46.7 |
| 3,194,779 | 7/1965 | Lynch et al. | 260—326 |

ALEX MAZEL, *Primary Examiner.*

HENRY R. JILES, DANIEL E. WYMAN, *Examiners.*

P. P. GARVIN, MARY U. O'BRIEN,
*Assistant Examiners.*